(No Model.)
J. G. ZIEGLER.
FITTING FOR BICYCLES.
No. 558,545. Patented Apr. 21, 1896.
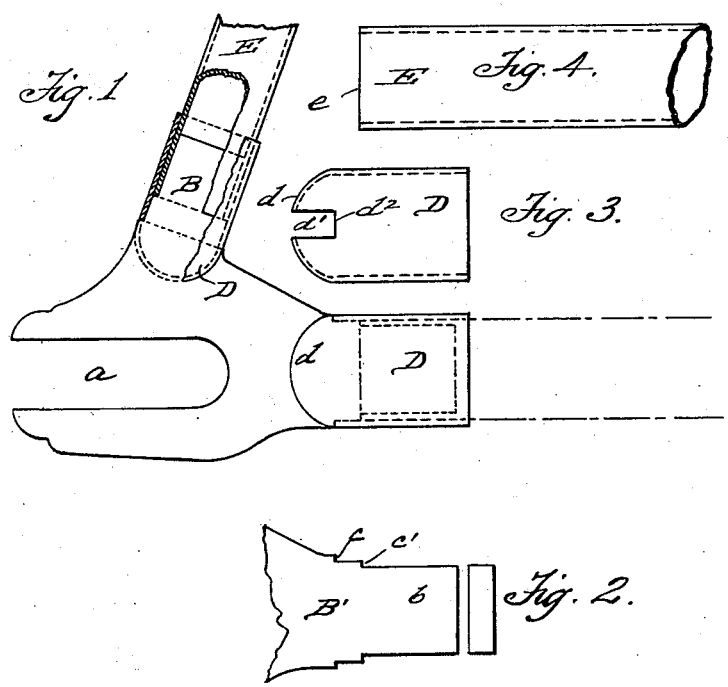
Witnesses:
David Levan
Donald M. Stewart
John G. Ziegler, Inventor.
by [signature], Attorney.

UNITED STATES PATENT OFFICE.

JOHN G. ZIEGLER, OF READING, PENNSYLVANIA, ASSIGNOR TO THE RELAY MANUFACTURING COMPANY, INCORPORATED, OF SAME PLACE, AND WM. I. GRUBB, OF POTTSTOWN, PENNSYLVANIA.

FITTING FOR BICYCLES.

SPECIFICATION forming part of Letters Patent No. 558,545, dated April 21, 1896.

Application filed August 31, 1895. Serial No. 561,146. (No model.)

*To all whom it may concern:*

Be it known that I, JOHN G. ZIEGLER, a citizen of the United States, residing at Reading, county of Berks, State of Pennsylvania, have invented certain Improvements in Fittings for Bicycles, &c., of which the following is a specification.

My invention relates more particularly to velocipedes, &c., in the construction of which tubing is largely employed; and it consists in certain improvements in the fittings and in the means of connecting the same to the tubing, whereby a strong, neat, and light junction is effected in an economical manner.

The invention is fully described in connection with the accompanying drawings, and is specifically pointed out in the claims.

Figure 1 illustrates my invention applied to the chain adjustment of a bicycle, showing one tubing connection complete, partly in cross-section, and the other with the coupling-sleeve attached to the fitting and the tubing indicated by dotted lines. Fig. 2 is a partial view of the sheet-metal fitting before the coupling-sleeve is attached thereto. Fig. 3 is a separate view of the coupling-sleeve. Fig. 4 is a separate view of the tubing.

$a$ represents a bicycle-fitting, which is punched out of sheet metal and shaped, as shown, to form the end of the rear fork, a slot $a'$ being provided to adjustably secure the rear axle as usual. This punched fitting is provided with two similar coupling extensions B and B', corresponding in the direction of their projection from the body of the fitting with the two members of the bicycle-frame to which connection must be made.

D represents a coupling sleeve or cap, one end of which is closed to form a head, as shown at $d$. A slot $d'$, corresponding in width with the thickness of the sheet-metal fitting, extends through the head into the cylindrical body of the sleeve. Through this slot the extension B or B' of the fitting passes into the sleeve, the slotted portion of which closely engages the sides of the fitting, while the forward portion of the extension enters the cylindrical portion of the sleeve, thus giving considerable firmness to the connection when the sleeve is pushed fully into engagement with the fitting even before the parts are brazed together to complete the production of a strong rigid fitting adapted to be easily and strongly secured to the tubing E. The end $d^2$ of the slot in the sleeve is made to abut against a shoulder $c$ on the coupling extension when the sleeve is in proper position on the latter, thus giving additional firmness and strength and a neat finish to the completed structure.

The tubing E, which is simply cut square at the end $e$, fits within the sleeve D and over portion $b$ of the fitting extension and abuts against the shoulder $c'$, in which position it is brazed to the sleeve and fittings, so as to form a permanent and rigid connection.

By means of my invention I am enabled to produce a strong and reliable junction of steel tubing with flat fittings, such as are very cheaply and accurately punched from sheet metal, and I accomplish this with a minimum of material and labor, while at the same time furnishing a structure of very neat appearance.

What I claim is—

1. A sheet-metal fitting having a coupling-sleeve attached thereto by means of an extension on said fitting closely engaging a slot in the head of the coupling-sleeve and projecting beyond the slot into the cylindrical portion of the sleeve substantially as and for the purpose set forth.

2. A sheet-metal fitting having a coupling-sleeve attached thereto by means of an extension on said fitting closely engaging a slot in the head of the coupling-sleeve and projecting beyond the slot into the cylindrical portion of the sleeve, in combination with a tubing fitted to said coupling-sleeve and having its end abutted against a shoulder on the fitting, substantially as and for the purpose set forth.

3. A sheet-metal fitting formed with a coupling extension in combination with a coupling-sleeve having a slotted head engaging said extension and a tubing engaging the coupling-sleeve, said tubing and sleeve being each abutted against a shoulder on the fitting, substantially as and for the purpose set forth.

In testimony whereof I affix my signature in presence of two witnesses.

JOHN G. ZIEGLER.

Witnesses:
W. G. STEWART,
CAMERON E. STRAUSS.